June 15, 1954 — W. V. VIERLING — 2,681,135
GLASSWARE TAKE-OUT DEVICE
Filed July 28, 1950 — 3 Sheets-Sheet 1

INVENTOR:
WALTER V. VIERLING,
BY Kingsland, Rogers & Ezell
ATTORNEYS

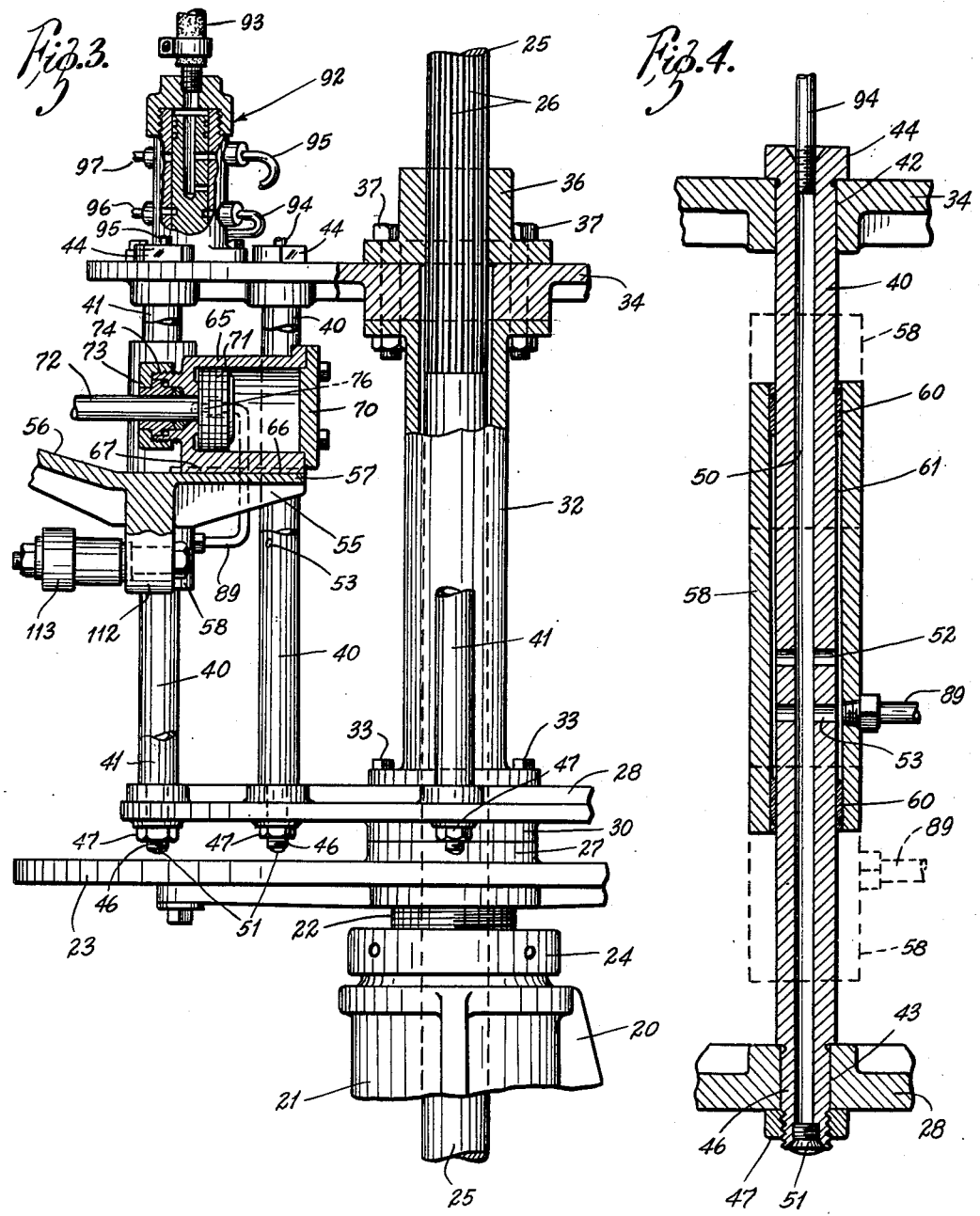

June 15, 1954 W. V. VIERLING 2,681,135
GLASSWARE TAKE-OUT DEVICE
Filed July 28, 1950 3 Sheets-Sheet 3
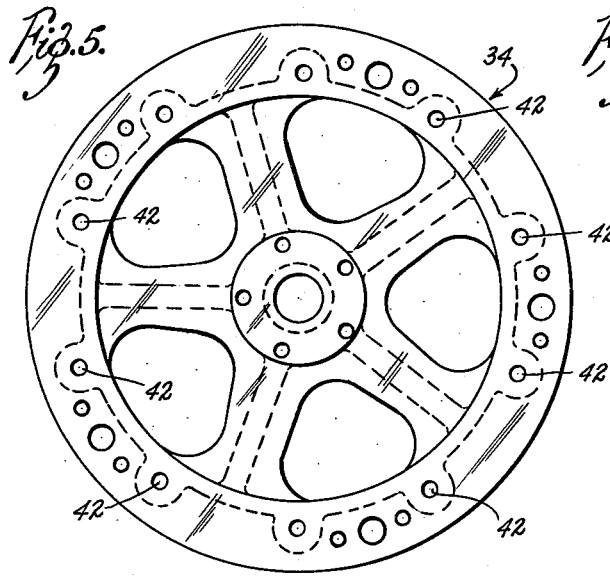
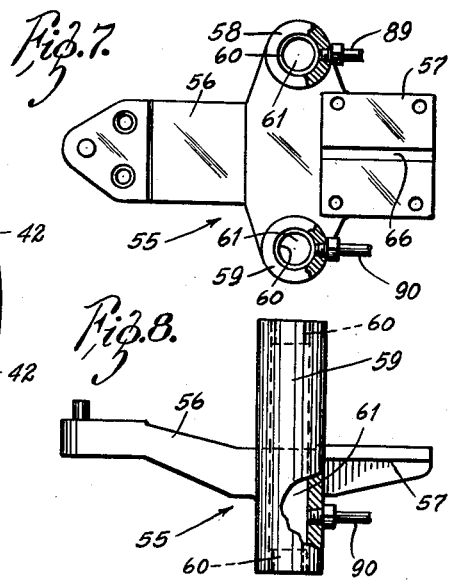
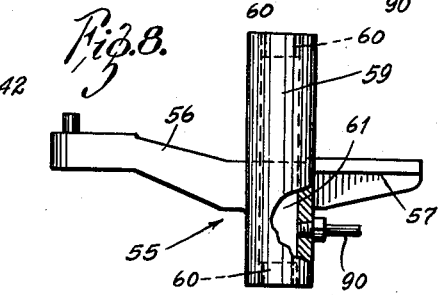
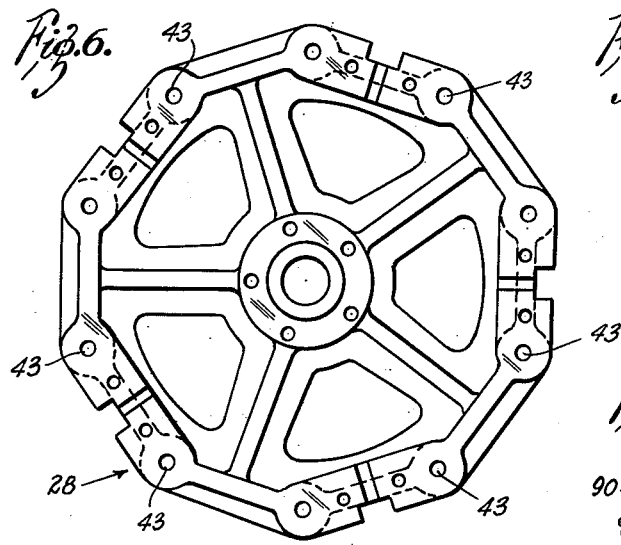
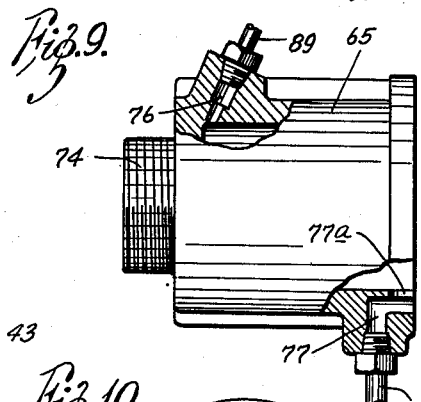
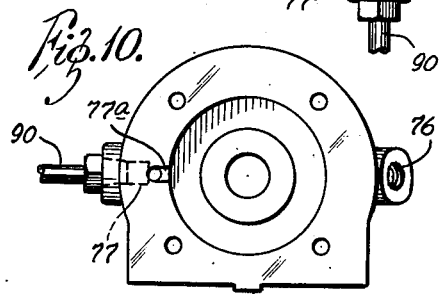
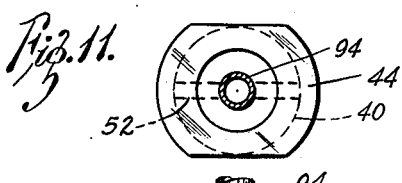
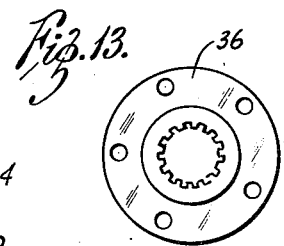
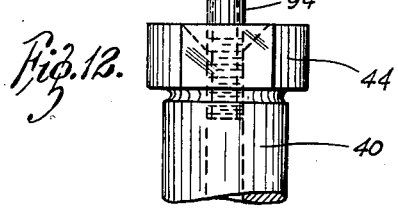
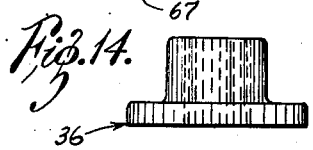
INVENTOR:
WALTER V. VIERLING,
BY Kingsland, Rogers & Ezell
ATTORNEYS Patented June 15, 1954

2,681,135

UNITED STATES PATENT OFFICE 2,681,135

GLASSWARE TAKE-OUT DEVICE

Walter V. Vierling, Knox, Pa., assignor of one-half to Henry C. Daubenspeck, Massillon, Ohio, and one-half to Samuel E. Winder, West Medway, Mass.

Application July 28, 1950, Serial No. 176,381

7 Claims. (Cl. 198—210)

The present invention relates to glassware take-out devices that are used for withdrawing glassware, and particularly glass container ware such as bottles, from a glass molding machine and transferring it to some other point, such as to a conveyer by means of which it may be moved to a lehr for further treatment.

In particular, the present inventions are improvements on a glassware take-out device heretofore the subject of a patent application, Serial No. 700,012, filed September 28, 1946, now U. S. Patent No. 2,609,943 issued in the name of Samuel E. Winder. In that machine, there is a carriage rotated about a vertical axis, with a plurality of take-out heads extending radially therefrom, which heads move vertically on the carriage during its rotation. Each head has take-out jaws operated to open and closed positions by a pneumatic motor mounted on the head and vertically moved with the head. A control valve for each head is mounted on the carriage so that it does not move vertically. The connections between the valves and the movable heads are made by flexible hoses.

Among the particular objects of the present invention are to eliminate some of the flexible hose connections in the machine, between the valves and the pneumatic motors, and to substitute fixed parts therefor. Specifically the present invention provides metal fluid passages between the valves and the motors. And it forms such passages in structural parts of the machine already largely present, so that it minimizes the number of parts, and takes full advantage of parts and operations already available.

Other features of the present improvement on the Winder application, Serial No. 700,012, are the provision of a better means for mounting the principal carriage of the take-out device on its operating shaft, so as to provide vertical adjustment thereof and to provide for rotation of the carriage by the shaft despite such relative axial displacement of the carriage on the shaft. Additional improvements will appear from the description to follow.

In the drawings:

Figure 3 is a view of the cylinder, valve and main shaft mounting of the parts shown in Figure 1, but with with a sectioning of the valve operating cylinder and upper main shaft connection;

Figure 4 is a vertical section through one of the peripheral column connections with its take-out head sleeve, taken on the line 4—4 of Figure 2;

Figure 5 is a plan view of the upper ring of the main carriage;

Figure 6 is a plan view of the lower ring member of the main carriage;

Figure 7 is a plan view partly in section of the slide bracket of one of the heads;

Figure 8 is a side elevation of the slide bracket shown in Figure 7;

Figure 9 is a plan view partly in section of one of the operating cylinders used on the heads;

Figure 10 is an end elevation of the cylinder of Figure 9, taken from the right side thereof;

Figure 11 is a plan view of one of the hollow columns connecting the two rotating tables and showing the air connection thereinto;

Figure 12 is an elevation of the upper end of the column shown in Figure 11;

Figure 13 is a plan view of the spline collar connecting the table to the main drive shaft; and Figure 14 is a side elevation of the spline collar of Figure 13.

Figures 1, 2:
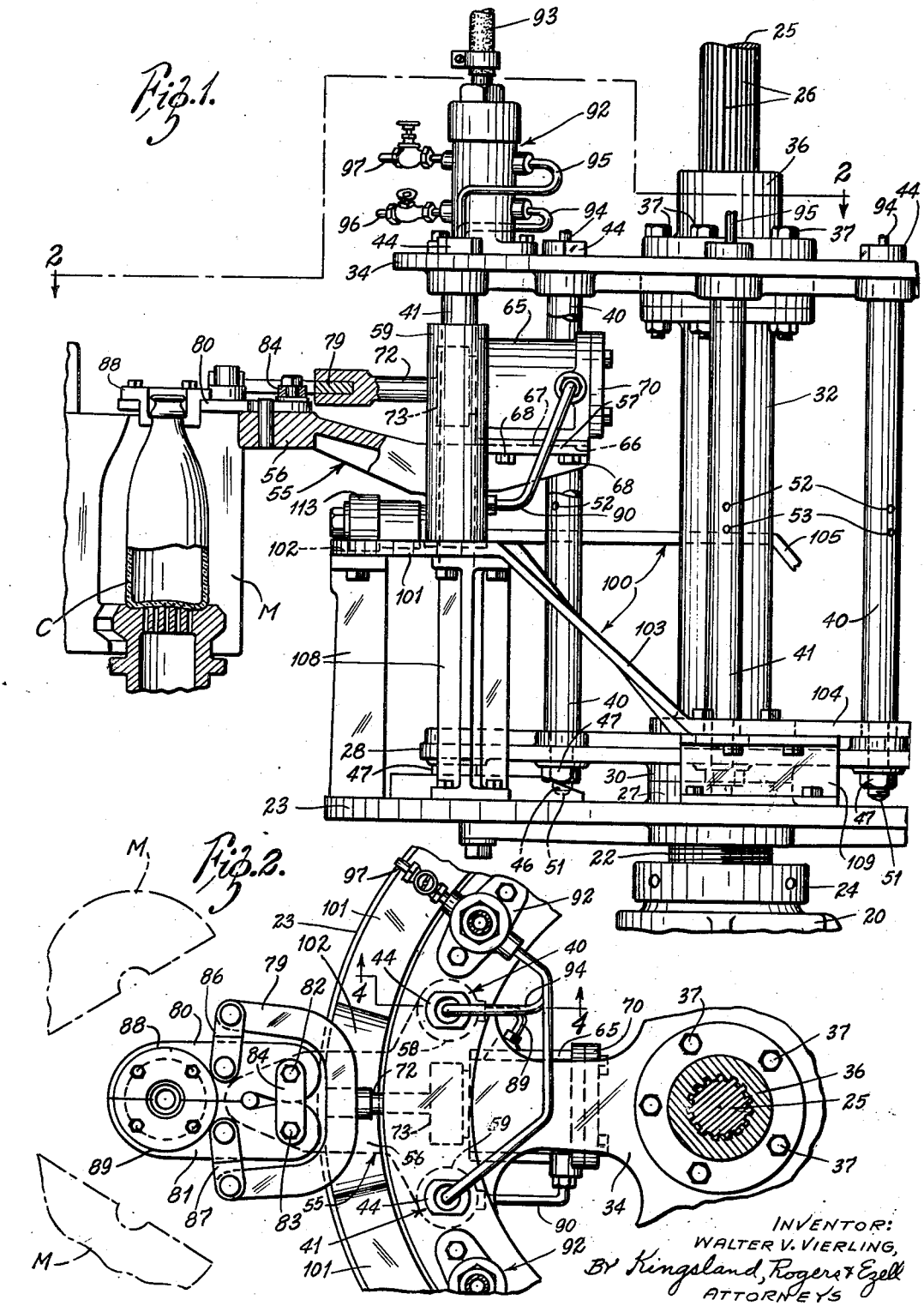
Figure 1 is a side elevation of the carriage associated with a mold, with one head on the carriage, the parts being shown in partial section.
Figure 2 is a plan view taken approximately on the line 2—2 at the top of Figure 1, certain parts being in section.

As explained in the Winder application mentioned, the present apparatus is especially designed for use with a rotating glass bottle forming machine. This take-out machine has a base for supporting a main rotating carriage that revolves about a vertical axis. The carriage has a plurality of peripherally arranged pairs of columns, extending between upper and lower rings. There are a plurality of ware take-out heads, one being mounted on each pair of columns in such wise that they can move vertically. Each of the heads also has a ware engaging jaw mechanism that is operated by a pneumatic cylinder, all of which structure is mounted on a head base or support. The vertical movement of the heads occurs during rotation of the carriage, and is designed to provide for the lifting of a bottle away from the glass forming machine and its transference to another device, such as a conveyer, that is laterally and vertically spaced from the point of take-out on the bottle forming machine.

In the present disclosure, only one of the ware takeout heads has been illustrated, since it can readily be understood that the remaining ones are disposed on similar columns that are arranged on the main carriage.

The present machine includes a base support device 20 that may be of the type shown in the Winder application. The base 20, as illustrated in the drawings and particularly in Figure 3, has an upper vertical bushing 21 formed to receive a depending threaded portion 22 that is formed to be integral with a main stationary support or table-like element 23. The skirt portion 22 is externally threaded and passes through an adjusting collar 24 on top of the bushing 21, there being another similar collar (not shown) at the lower end of the bushing 21. By means of the two collars, the vertical position of the principal support 23 may be adjusted and secured in adjusted position.

A main driving shaft 25 extends upwardly through the bushing 21 and through the hollow skirt 22, and projects out the top of the machine for support at its top as is indicated in the other application. A portion of the upper end of the shaft 25 herein illustrated has splines 26 thereon for a purpose to appear.

The stationary table 23 has a center hub 27 which may contain a vertical thrust bearing to provide for rotation of the rotating carriage, as will appear.

The rotating carriage has a lower ring 28 with a hub 30. This hub cooperates with the hub 24 on the stationary table 23 to provide enclosure for a thrust bearing upon which the carriage rotates. As shown in Figure 6, the lower ring 28 has five stations thereon for five separate ware engaging heads, as will appear.

The center column 32 is hollow so that it can pass around the main driving shaft 25. Its lower end is bolted at 33 to the lower ring 28. Its upper end is also flanged so that it can support an upper ring 34. Above the upper ring 34, there is a splined collar 36 that fits over the splines 26 of the main shaft 25. Bolts 37 connect the splined collar 36, the upper table element 34 and the column 32, so that they all rotate together. The splines give positive drive of the carriage by the shaft, and yet permit the carriage to be adjusted vertically on the shaft.

The two rings 28 and 34 are joined by a plurality of peripheral columns arranged in pairs, the members of each of the pairs being designated at 40 and 41. As shown especially in Figures 4, 11 and 12, the columns pass down through openings 42 in the upper ring 34, and openings 43 in the lower ring 28. The upper end of each of the columns has an enlarged head 44 on it, limiting its downward movement. This head is shaped with opposite flats as shown in Figure 11 to accomodate a wrench. The lower end of the columns is reduced at 46 to pass through the opening 43. A nut 47 clamps the lower end of the column 40 below the lower table member 28.

The columns 40 and 41 have hollow passages 50 therethrough, these passages being plugged by plugs 51 at their lower ends. Two cross passages 52 and 53 cross through the passage 50 for purposes to appear.

Each pair of columns 40 and 41 supports a take-out cylinder slide bracket 55, one being shown separately in Figures 7 and 8. Each slide bracket 55 includes a horizontal table portion with a forwardly or outwardly extending part 56 and a rearwardly or inwardly extending part 57. On opposite sides of the table portion, there are two vertical tubular sleeve elements 58 and 59 that fit over the respective columns 40 and 41.

The opposite ends of the sleeves receive bushings 60, that slidably bear on the columns, the bushings having O-ring seals to prevent escape of air. By the bushing arrangement, each sleeve 58 and 59 has an elongated cylindrical space 61 between its inner wall and the column. These spaces communicate with the axial passages 50 in the columns 40 and 41 through the ports 52 and 53.

The inward table portion 57 of the slide bracket 55 supports a pneumatic cylinder 65. The inward portion 57 has raised pads on its upper surface to provide a locating groove 66 and the cylinder 65 has a related locating rib 67. By this means, the cylinders can be immediately located on the brackets 55 in a radial direction. This affords standardization permitting the cylinders to be interchanged, and also the brackets likewise to be interchanged. The cylinders are bolted to the inward table portion 57, as shown at 68.

The cylinder 65 is closed by a head 70. It also receives a piston 71 with a piston rod 72. A packing gland 73 fits into an outwardly projecting central boss 74 on the cylinder 65. The outer end of the cylinder has a fluid port 76 formed in a suitable boss; and the inner end of the cylinder has a port 77 that is also formed in a suitable boss. It will be noted from Figure 9 that the port 77 has a right angular configuration including a notched cut-out 77a that connects into the inner end of the cylinder.

The piston rod 72 has a yoke 79 on its outer end. The outer table portion 56 of the slide bracket 55 pivotally supports two complementary takeout jaw carriers 80 and 81, these being pivoted respectively at 82 and 83 to the table portion 56. A tie link 84 is connected under the pivot bolts 82 and 83. The two arms of the yoke 79 are connected to the two take-out jaw carriers by jaw links 86 and 87, respectively, these jaw links being pivoted to their connected elements. Thus it will be seen that, as the yoke moves in or out, it will open and close the two take-out jaw carriers 80 and 81. The two carriers support take-out jaws 88 and 89 that are removable, so that they may be adapted to the shape of the ware being taken out. Figure 1 shows one of the take-out jaws 88 in elevation and in relationship to a mold M containing a glass container C.

The two bracket sleeves 58 and 59 have their air spaces 61 connected respectively to the opposite ends of the cylinder 65. A pipe 89 is fastened into the sleeve 58 to connect through its wall. This pipe leads to and is connected with the outer port 76 of the cylinder. A similar pipe 90 connects the sleeve 59 to the inner port 77 of the cylinder.

In order to supply air to the opposite ends of each of the cylinders 65, four-way valves 92 are used. One of these valves 92 is illustrated. It is mounted upon the upper ring 34 of the main carriage. It is shown in detail in the previously mentioned Winder application, and so need not here be described more than briefly. There is a compressed air inlet 93 leading to the top of the valve housing. There is a pipe connection 94 leading from the lower part of the housing into the top of the column 40. There is also a pipe 95 leading from the upper part of the housing into the column 41. The valve 92 has two valved exhaust ports 96 and 97, that correspond respectively to the two pipes 94 and 95. The valve is cam operated so that at proper times compressed air from the inlet line 93 is conducted into the pipe 94, while at the same time the pipe 95 is connected to its exhaust 97. At other times, cam operation of the valve reverses the foregoing connections so that compressed air is delivered to the pipe 95 while the pipe 94 is connected to its exhaust 97.

In contradistinction to the Winder application, the present valve does not require flexible connection to the cylinder 65, because the lines 94 and 95 from the valve can connect into the columns 40 and 41, as aforesaid, with removable connections.

The cylinder with the take-out jaws all mounted upon the slide bracket 55 is subjected to vertical displacement. This vertical displacement occurs as the main frame rotates, and is described in detail in the Winder application. For present purposes, it is sufficient to note that there is a cam track 100 mounted upon the fixed table 23. It has a high section 101 with a depression 102 in it at the point of take-out. Then there is a sloping section 103 that lowers down to a lower section 104. On the other side of the machine from that shown in Figure 1, the track has a rising section 105 that leads back up to the upper level. The track 100 is supported on the fixed table 23 by suitable columns such as those at 108 and 109.

There is a cam roller 113 mounting on the slide bracket 55 to cause the bracket to follow the elevations of the cam track 100. As shown particularly in Figure 3, there is a central depending part 112 on the bracket 55 to which is mounted the cam roller 113. This roller extends outwardly so as to ride upon the track 100 and to cause the slide to follow the elevations thereon.

*Operation*

The entire take-out machine has a number of take-out units mounted around it. In the particular illustration, there are five such units, each of which includes a slide bracket 55 mounted upon two adjacent columns 40 and 41, and supporting its cylinder 65 and take-out jaw assembly. Each unit also includes a valve 92.

The machine is located so that the short depression 102 in its cam track 100 is disposed opposite the take-out point of the molding machine. When used in connection with a conventional molding machine, the molds M will move arcuately and may be in continuous rotary motion, with a selected number of them on a rotating table so that they are moved to the take-out position successively in predetermined time intervals.

The main carriage of the take-out machine rotates continuously in synchronism with the rotation of the mold table. This drive occurs in the present machine by the rotation of the shaft 25, which rotation is communicated through the spline 26 and the spline collar 36 to the main take-out carriage. In the installation of the machine, compressed air is supplied to the line 93 by such means as are convenient, and the means shown in the Winder application are satisfactory.

As each take-out jaw assembly is moved by the rotation of the main take-out carriage to the position illustrated in Figures 1 and 2, the jaws 88 and 89, while yet open, are moved across the mold, and jaw 89 is moved across the top of the container C. Immediately after this last, the cam roller 113 descends into the slightly lowered portion 102, so that the head descends somewhat and is then in position so that it may close and engage the container C immediately below the finish thereof. This may be considered as the starting point of a cycle.

At this starting point, the operating means for the valve 92 causes the valve to port air under pressure through the line 95 into the column 41. This air moves through the passage 50 in the column 41, and leaves through the cross passages 52 and 53 so as to enter the space 61. The space 61 connects by way of the pipe 90 to the inner end of the cylinder 65. At the same time, the valve 92 connects the pipe 95 to the exhaust 97 so that the outer end of the cylinder 65 is connected by the port 76, the line 89, the space 61, the ports 52 and 53, the passage 50 in the column 40, and thence by way of the pipe 94 to the exhaust through the exhaust line 96. The valve in the exhaust line 96 can regulate the speed at which the piston rod 72 moves outwardly, closing the two jaw supports 80 and 81 to bring the take-out jaws 88 and 89 into closed position around the neck of the container C.

Immediately thereafter, the main carriage, with the container C held, moves counterclockwise in Figure 2 (the mold sections M similarly moving downwardly in Figure 2); and the cam roller 113 moves out of the depression 102 to elevate the container C and lift it off of the bottom plate of the mold. As soon as the take-out device has moved the container C laterally far enough to clear it from the mold machine, it may lower it. As shown here, the elevated section 101 of the track 100 provides this generally horizontal movement at an elevation slightly above the head of the bottom plate of the mold. After this, the cam roller 113 descends the section 103 of the cam track, causing the take-out head to be lowered. It will be seen that, when the head is in its most elevated position on the cam track 101, the two pipes 89 and 90 leading into the respective sleeves 58 and 59 will register through the spaces 61 in the respective columns 40 and 41, so as to maintain the air pressure conditions as fixed by the valve 92 all during vertical movement of the heads.

When the head 55 reaches the lower level, it will in due course arrive at the ware discharge point, at which time the valve 92 will be reversed so that air is then ported to the column 40 by the pipe 95. Air in the column 40 will be delivered through the pipe 89 to the outer end of the cylinder 65, driving the piston 71 inwardly, which action expels the air at the right end of the piston in Figure 3 outward through the pipe 90 to the sleeve 59, whence it is forced through the passage 51 and the line 95 across the valve 92 to exhaust out the passage 97. This action opens the jaw holders 80 and 81 and separates the two jaws 88 and 89 so that the ware can be deposited upon a conveyer or the like at the discharge point.

As the machine continues to rotate, the cam roller 113 will again ride up on the cam track 100 to the upper elevation with the jaws remaining open. The two jaws at the top level again ride across the top of a new mold M and container C, and, with the forward or leading jaw 89 across to the far side of such container C, the cam roller 113 again drops into the groove 102 to start a new cycle.

It will be seen that in this arrangement there are no flexible tubes required for connection of any of the valves 92 with its respective cylinder 65. The connections are all by solid members, consisting of the several tubes and the combinations of the columns and the sleeves sliding over the columns. The use of two holes 52 and 53 permits use of shorter columns, since one hole may be covered at one extreme of the head movement, and the other at the opposite extreme. Yet the connections for air flow are made through structural parts of the machine that are present for additional purposes, except for a few fixed pipes. The various machine parts remain interchangeable, this being true even of individual columns 40 and 44. Wear is accounted for by replaceable bushings, and packing elements such as O-rings.

What is claimed is:

1. In a machine of the kind described, a rotatable carriage having a pair of parallel elongated members, a take-out head, means for mounting the take-out head on the carriage for sliding movement thereon including a member having parallel sleeve elements slidably embracing said elongated members, and fluid conducting means in said mounting means including dual communicating passage means between the head and the carriage, said communicating means being effective to maintain simultaneous two-way fluid conducting communication between the head and the carriage during at least a substantial part of the sliding movement of the head on the carriage.

2. The combination of claim 1 wherein the fluid conducting means comprises a fixed fluid passage in the carriage, plus a control valve on the carriage connected with the fixed passage and with each of the dual communicating passage means between the head and the carriage, and means for operating the valve as the carriage rotates.

3. The combination of claim 2, plus fluid exhaust means connectable through said control valve with either of the dual portions of said previously mentioned fluid conducting means, and wherein the control valve is adapted to communicate one of said portions with the fixed fluid passage in the carriage and the other of said portions with said exhaust means and vice versa.

4. The combination of claim 3, plus a reversible fluid power motor mounted for movement with the head, said dual fluid conducting systems being connected respectively into opposite ends of the power motor, and adjustable regulating means connected to said previously mentioned exhaust means for controlling the speed of operation of the motor.

5. The combination of claim 4, plus take-out jaw means connected with the power motor to be opened and closed thereby.

6. A machine of the kind described, a base, a rotatable carriage on the base, the carriage having spaced ring members, a pair of parallel columns connecting said ring members, a take-out head having spaced sleeves engageable slidably on the respective columns for sliding movement thereon, take-out means on the head, a reversible fluid motor on the head for operating the take-out means, a passage in each column, a passage in each sleeve, one of said passages being elongated to maintain fluid connection during at least a substantial part of the sliding movement of the head, a valve, the sleeve passages connecting respectively to opposite ends of the power motor, a valve control on the carriage, having piping to the two passages in the columns, and means to reverse the connections through the valve control during rotation of the carriage.

7. A glassware take-out machine including a base, a rotatable carriage having a central vertical column, a drive shaft passing through the column and a spline connection between the drive shaft and the carriage; a lower ring connected to the column, an upper ring on the column, and a plurality of pairs of parallel peripheral columns around the carriage, extending between the two rings, a plurality of take-out heads, each having radially extending support parts and two laterally arranged, vertical sleeves engaged slidably on a pair of the peripheral columns, a reversible fluid motor on a support part of the head, a ware take-out means on a support part of the head, and connected with the motor to be operated by it; a valve on one of the rings, there being a valve for each head, the valves being adapted to be connected to two differential fluid pressures; a pipe from each valve to each column, a passage through each column, a passage in each sleeve, the sleeves being of length to maintain their passages in registry with the column passages during vertical movements of the heads, and passage means from the sleeves to opposite ends of the motors.

References Cited in the file of this patent

UNITED STATES PATENTS

| Number | Name | Date |
| --- | --- | --- |
| 836,989 | Oliver | Nov. 27, 1906 |
| 1,395,232 | Kronquest | Oct. 25, 1921 |
| 1,575,185 | Stenhouse | Mar. 2, 1926 |
| 1,935,739 | Freese | Nov. 21, 1933 |
| 2,359,433 | McNamara | Oct. 3, 1944 |
| 2,415,997 | Eldred | Feb. 18, 1947 |